DATA TRANSMISSION SYSTEM HAVING MEANS FOR COMPARING SIGNAL DURATION AND AMPLITUDE

Filed Aug. 18, 1966

Inventors
Ian R. Young
Arthur G. Keefe
Geoffrey Moss
By Kemon Palmer, Stewart & Estabrook
Attorneys Inventors
Ian R. Young
Arthur D. Keefe
Geoffrey Moss
By Kemon, Palmer, Stewart & Estabrook
Attorneys Inventors
Ian R. Young
Arthur B. Keefe
Geoffrey Moss
By Lemon, Palmer, Stewart & Estabrook
Attorneys United States Patent Office 3,475,727

Patented Oct. 28, 1969

3,475,727

DATA TRANSMISSION SYSTEM HAVING MEANS FOR COMPARING SIGNAL DURATION AND AMPLITUDE

Ian R. Young, Middlesex, Arthur T. Keefe, Manor Gardens, London, and Geoffrey Moss, Middlesex, England, assignors to Evershed & Vignoles Limited, London, England, a British company Filed Aug. 18, 1966, Ser. No. 573,321

Claims priority, application Great Britain, Aug. 25, 1965, 36,535/65

Int. Cl. H04b *1/16;* H04q *5/14*

U.S. Cl. 340—147 14 Claims

In data transmission systems it is frequently required to convert electric signals in which data is expressed by variations of a first parameter into electric signals in which the same data is expressed by variations of a different parameter. Sometimes this can be achieved with accuracy by means of simple circuits but in cases where a signal amplitude has to be converted into a signal duration, or a duration has to be converted to an amplitude, accuracy is more difficult to obtain.

According to the present invention apparatus for performing such a conversion involving a signal of variable duration as the starting signal or the signal to be obtained, includes a closed loop including means for generating a signal corresponding to an inequality in the relationships between a variable voltage and a fixed reference voltage, on the one hand, and a fixed reference duration and a variable duration on the other hand, one of the variable parameters being an input to the system and the other an output, together with a correcting circuit which receives the said signal and modifies the output variable in such a sense as to reduce the inequality. As an example, if the input data consists of the distance travelled by a wiper arm along a potentiometer, the voltage derived from the wiper can be chopped to give pulses of a reference duration and the reference voltage applied across the potentiometer can be chopped at the same fundamental frequency to provide pulses of reference voltage amplitude; the amplitude duration product of the two sets of pulses are compared and any inequality appears in an error signal which is applied to an encoder controlling the length of the pulses which chop the signal of reference amplitude, the arrangement being such that this variable duration is adjusted until the inequality signal at the comparator is reduced to zero.

In this simple case, a reference voltage was readily available from the voltage applied across the potentiometer. This may not always be the case, one example in which no reference is available being a circuit which receives a current representing by its amplitude an item of data. In such a case, it is possible to generate a pseudo-reference by passing the current through a circuit which is controlled by a voltage to be used as a reference and which is such that any undesired variations in the reference voltage will cause corresponding variations to appear in the current.

In order that the invention may be better understood, one example will now be described with reference to the accompanying drawings, in which.

Figure 1:
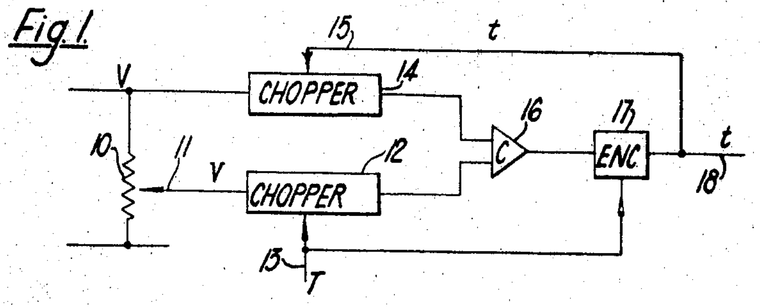
FIGURE 1 illustrates diagrammatically apparatus for converting a signal amplitude into a corresponding signal duration.

FIGURE 1 is a block diagram illustrating the principle of the invention. A reference voltage V is applied across a potentiometer 10, the position of the wiper 11 of which constitutes the input variable in this example. This input variable is therefore represented by the voltage $v$ obtained from the wiper. The voltage $v$ is applied to a chopper 12 in which it is chopped at the frequency of a signal of reference duration T, applied to the chopper 12 by way of conductor 13. The reference signal V is applied to another chopper 14 which chops the reference signal at the same fundamntal frequency as the chopper 12 but for periods determined by the duration $t$ of the signals on conductor 15.

Thus, at the output of the chopper 12 there will be a series of pulses of amplitude $v$ and duration T and at the output of the chopper 14 there will be a series of pulses of amplitude V and duration $t$. The amplitude-duration products of these pulses are compared in a comparator 16. If the ratio $V:v$ is equal to the ratio $T:t$, these two products will be equal and therefore the comparator output will show zero error. If, however, they are unequal, an error signal will be applied from the comparator 16 to an encoder 17 which is controlled in frequency by the signal of duration T on conductor 13 and which is responsible for generating the pulses of duration $t$ on conductor 15. It will be seen that the system is a closed loop in which any inequality in the ratios given above will produce a feedback signal to remove the inequality. The output pulses of duration $t$ from encoder 17 are also applied to the output conductor 18. The duration of these pulses varies with the amplitude of the input signal $v$.

Figure 2:
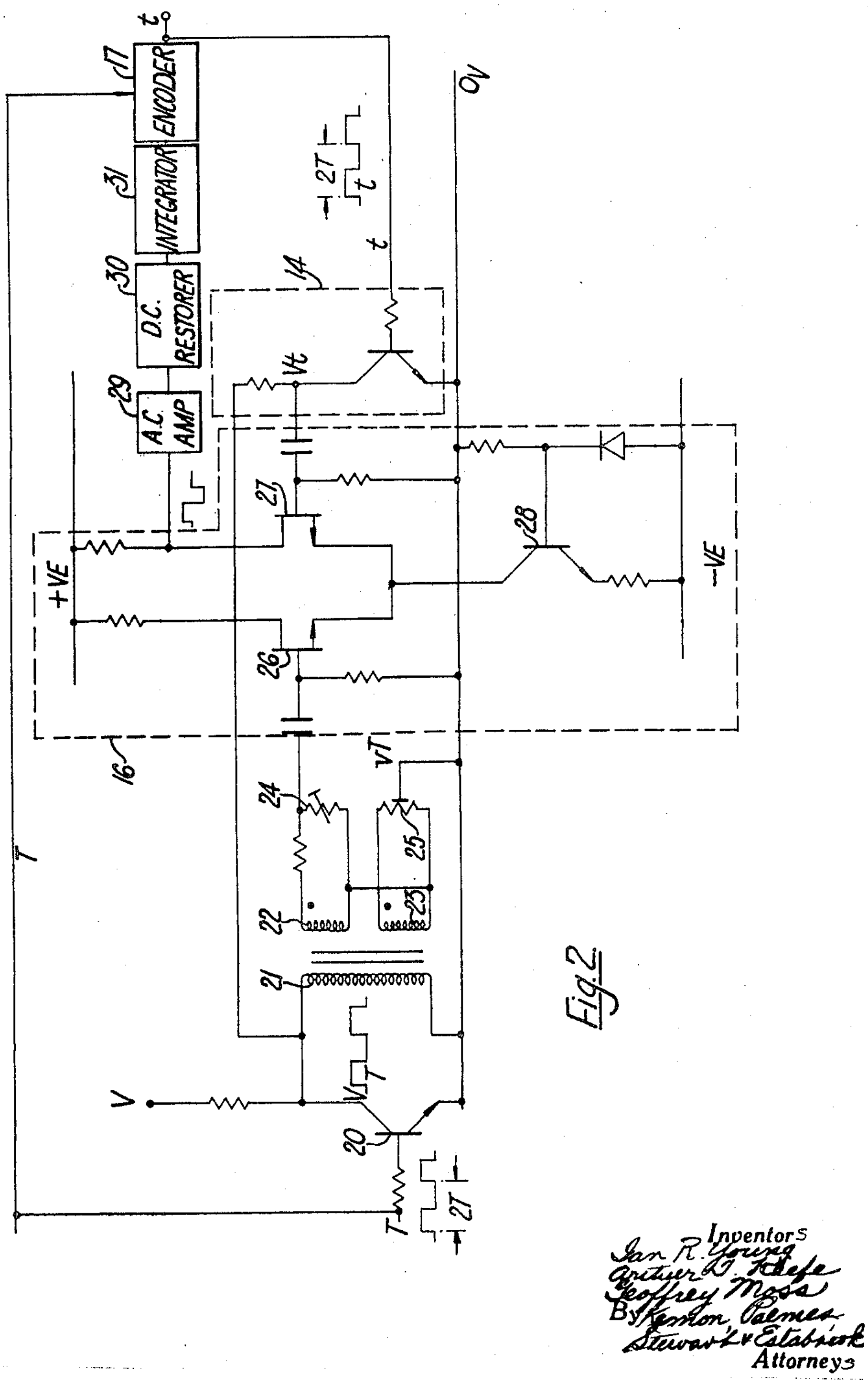
FIGURE 2 shows the apparatus of FIGURE 1 in a more practicable form.

In addition to showing the circuit in a more practicable form, FIGURE 2 differs from FIGURE 1 in the manner in which the input signal is derived and chopped. In this case a signal of reference voltage V and of reference duration T is applied to the collector of a transistor 20 the base of which receives a signal of square waveform and of period 2T. The voltage which appears across a transformer primary winding 21, connected across the collector and emitter of the transistor, is thus a square waveform of amplitude V and period 2T. The transformer has two secondary windings 22 and 23, an instrument 24 of variable resistance (such as a resistance thermometer or strain gauge) being connected across the winding 22 and a preset potentiometer 25 being connected across the winding 23. One end of the winding 22 is applied to the comparator 16 and the wiper of the preset potentiometer 25 is connected to the zero voltage line to permit setting of the zero for the comparator. The signal $v$ derived from the instrument 24 is already chopped at the reference duration T and can therefore be applied directly to the comparator 16. The chopped reference voltage V at the primary winding 20 is applied to the chopper 14, as the collector voltage for a transistor 26 and is additionally chopped by the output signals of duration $t$ as a consequence of a connection to the base of the transistor from the output of the encoder 17. The signal applied to the comparator 16 from the chopper 14 is therefore of amplitude V and of the duration of the output signal $t$. The comparator comprises two emitter-coupled field-effect transistors 26 and 27, the emitter circuit of which includes the collector-emitter path of a further transistor 28, the base of which is held at a reference potential. The voltage at the collector of transistor 27 represents the unbalance of the two inputs. Since the leading edges of the two input pulses are simultaneous, the output of the comparator starts with a pulse representing, by its amplitude with respect to a base line, the excess of the reference voltage V over the input signal $v$. At the end of time $t$, the input signal $Vt$ disappears and the output then changes polarity with respect to the said base-line and represents the amplitude $v$ for the remainder of the period T. If the duration $t$ is correct, the areas under the waveforms on the two sides of the base-line will be equal. If $t$ is not correct, the output signal, after passage through an A.C. amplifier 29, a D.C. restorer 30, and an integrator 31, will cause the encoder 17 to increase or decrease the length of its output pulses, according to the sense of the error.

Figure 3:
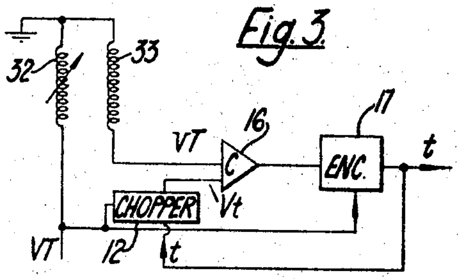
FIGURE 3 illustrates an alternative form of amplitude-duration conversion apparatus.

The encoder may be of the kind shown in FIGURE 3 of our copending application No. 772,440 filed Oct. 31, 1968. Such an encoder has a transistor with an earthed emitter and a collector connected through a load to a supply voltage terminal. The base is connected to a circuit providing a constant current drain which ensures that normally the transistor is held in its conducting condition. The base is also connected through a capacitor to the signal source and the capacitor plate remote from the base is connected to a switch by means of which it can be earthed. When this plate is earthed the potential on the other plate of the capacitor changes by the amount of the signal voltage, causing the transistor to stop conducting until the signal voltage is removed by the constant current drain, the time required for this being dependent on the signal voltage amplitude. The constant current circuit may include a transistor operated in the grounded base mode.

In the apparatus shown in FIGURE 3, the variable to be measured is represented as the coupling between two coils 32 and 33. A signal of reference voltage V and reference duration T is applied to the coil 32 and there is obtained from the coil 33 a signal $v$ representing the input variable. The signal $v$ is already in the form of pulses of duration T, by virtue of the signal applied to the winding 32, and can therefore be applied directly to the comparator 16. A chopper 12 receives the signal of reference V and additionally chops it with the output signal of duration $t$ from the encoder 17. As before, the two pulsed signals are applied to the comparator 16 and any inequality is reflected in an error signal applied to the encoder 17, which will modify the duration $t$ to remove the inequality at the comparator input.

This system of measurement has the advantage that the reference duration T can be determined with an extremely high degree of accuracy. As an example, it is a relatively simple matter to produce a duration with an accuracy of one part in a million and this can be done much more readily than other standards of measurements can be created to the same degree of accuracy. Moreover, since a closed loop system is employed, the individual performances of the comparator amplifier and encoder need not be very high.

Figure 4:
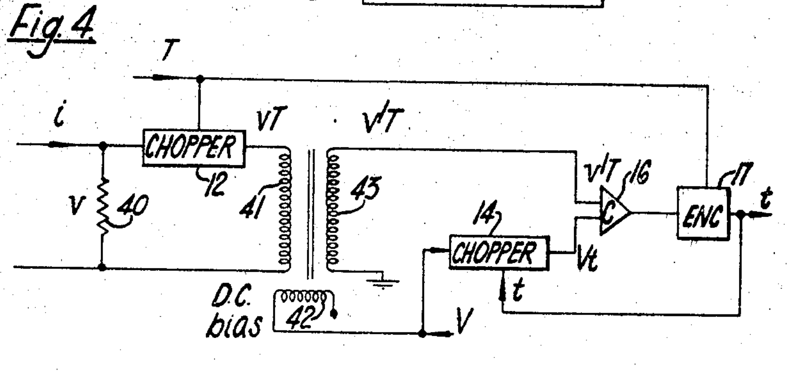
FIGURE 4 illustrates a circuit for generating a pseudo-reference.

FIGURE 4 is concerned with the case in which it is desired to measure a current $i$ from a source for which there is no reference voltage available. A reference voltage V is used as in the preceding examples but is additionally used to control the amplitude of the input variable, so that any undesired variations in the amplitude of the reference voltage V will be reflected in corresponding variations in the input variable signal. This is achieved by passing the input current $i$ through a known resistor 40 to create a voltage drop $v$ across the resistor, and applying this voltage through a chopper 12 to the primary winding 41 of a transformer of the saturable reactor type. As in the preceding examples, the chopper 12 is fed with pulses of duration T so that the pulses appearing across the primary winding are of amplitude $v$ and duration T. The transformation ratio of the transformer is affected by a D.C. bias applied to winding 42 and derived from the reference voltage V. The secondary winding 43 develops pulses of amplitude $v'$ and duration T. These output signals are thus modified by the behaviour of the reference voltage V and the measuring technique of the earlier examples can be adopted. Thus the signals from the winding 43 are applied directly to the comparator 16 and the comparator also receives signals of reference voltage V after these have been chopped in the chopper 14 by pulses of duration $t$ from the encoder 17.

Figure 5:
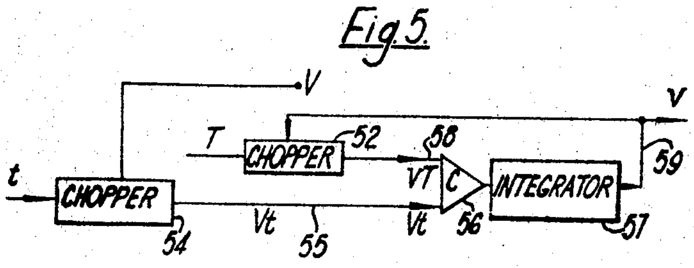
FIGURE 5 is a circuit diagram of apparatus for converting a signal duration to a signal amplitude.

FIGURE 5 is a block diagram illustrating the application of this ratiometric principle to the inverse problem, namely receiving a signal of duration $t$ represting an input variable and deriving from it a signal of amplitude $v$ which also represents the input variable. In this case, the reference voltage V is applied to a chopper 54 to which the input signal $t$ is also applied as the interrupting signal. The output signal from this chopper is therefore obtained on conductor 55 in the form of pulses of amplitude V and duration $t$. These pulses are applied to the comparator 56. Pulses of reference duration T are applied to a chopper 52, which also receives a signal of voltage $v$ from an integrator 57, the pulses from the chopper being of duration T and amplitude $v$. These pulses too are applied to the comparator 56 by way of conductor 58 and as before, any inequality in the products $Vt$ and $vT$ will result in an error signal from the comparator 56 which will modify the output of the integrator 57. Such modification will continue until the inequality is removed, that is to say until the relationship between the output voltage on conductor 59 and the reference voltage V corresponds to the relationship between the input duration $t$ and the reference duration T.

If a number of such measuring circuits are in the vicinity of one another and it is not required to obtain a reading from more than one at a time, the encoder and comparator circuits can be shared in time between the various measurement inputs. For example, if gate-controlled circuits are introduced into the time signal lines to the choppers and if the choppers are A.C.-coupled to the comparator, a number of choppers can be connected in common to a single comparator and encoder, the gates ensuring that only one chopper on each side is energised at any one time.

Figure 6:
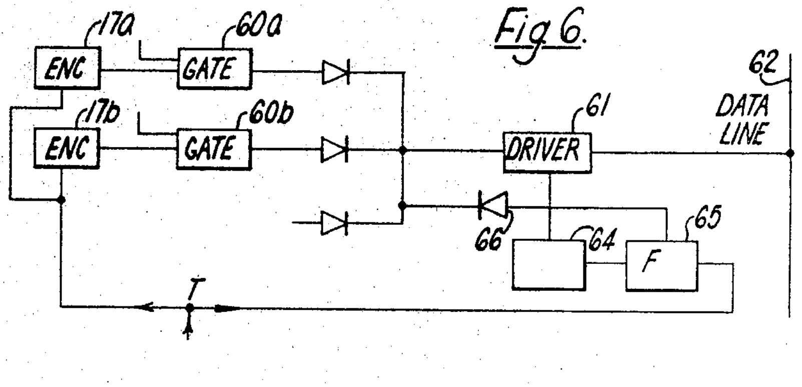
FIGURE 6 represents a circuit for reducing errors in transmitted signals of the kind produced by the apparatus of FIGURE 1.

Because the circuits described above permit the conversion of a voltage amplitude to a pulse duration with high accuracy, it is necessary to exercise particular care in transmitting such pulses to avoid time effects in line driving circuits, line buffer amplifiers, and in the line itself. FIGURE 6 illustrates a circuit for reducing such effects to a minimum. In FIGURE 6, each of a number of encoders **17*a*, 17*b*, etc. is connected to a different gate 60*a*, 60*b*, etc. The outputs of these gates are applied through rectifiers to a line driver circuit 61 and thence to the data line, along which the output signals are transmitted to a remote receiver. In the circuit of FIGURE 6, the data pulses from the line driver 61 are also applied to a monostable circuit 64 which actuates a bistable circuit 65. The latter applies a pulse through a rectifier 66 to the input of the line driver circuit 61, which therefore applies a further signal to the data line 62. The bistable circuit 65 is restored to its original condition by the trailing edge of the pulse T of reference duration and this terminates the further pulse on the data line. As a consequence, the signal received at the remote station by way of the data line 62** will have a total length of the same magnitude as the duration T although there will be in it a short pulse the leading edge of which signifies the end of the duration $t$ which represents the variable. By comparing the time to the end of the first pulse with the total time of the received signal, the line is eliminated and the errors reduced to the uncertainty of the switching-on time of the encoder. This can be made very small indeed.

The output signals from these encoders can be applied to a transmission system of the kind described in our copending application No. 772,440 filed Oct. 31, 1968. This specification describes a system for transmitting calling pulses having a predetermined but variable duration to a transducer, each transducer being responsive to a different duration of calling pulse. A recognition unit in the transducer having a time comparator circuit is triggered into operation by the leading edge of a received pulse and provides a suitable indication if the trailing edge of the pulse occurs at or close to the end of a predetermined period which is characteristic of the time comparator circuit in question, the period being initiated by the arrival of the leading edge of the transmitted pulse. When the time comparator receives a pulse of its characteristic length (or when each of several time comparators has received pulses of its characteristic length) the recognition unit places the transducer in a condition for transmitting data to or receiving data from a communication channel. If desired, the pulses of reference duration T may be derived from the calling pulse pattern but the circuits are simplified if these two functions are separated. Basically, it is only necessary to gate the output signal from an encoder with a signal derived from a calling pulse discriminator, the output signal from the gate being applied through a line driver to the data line.

Figures 7, 8:
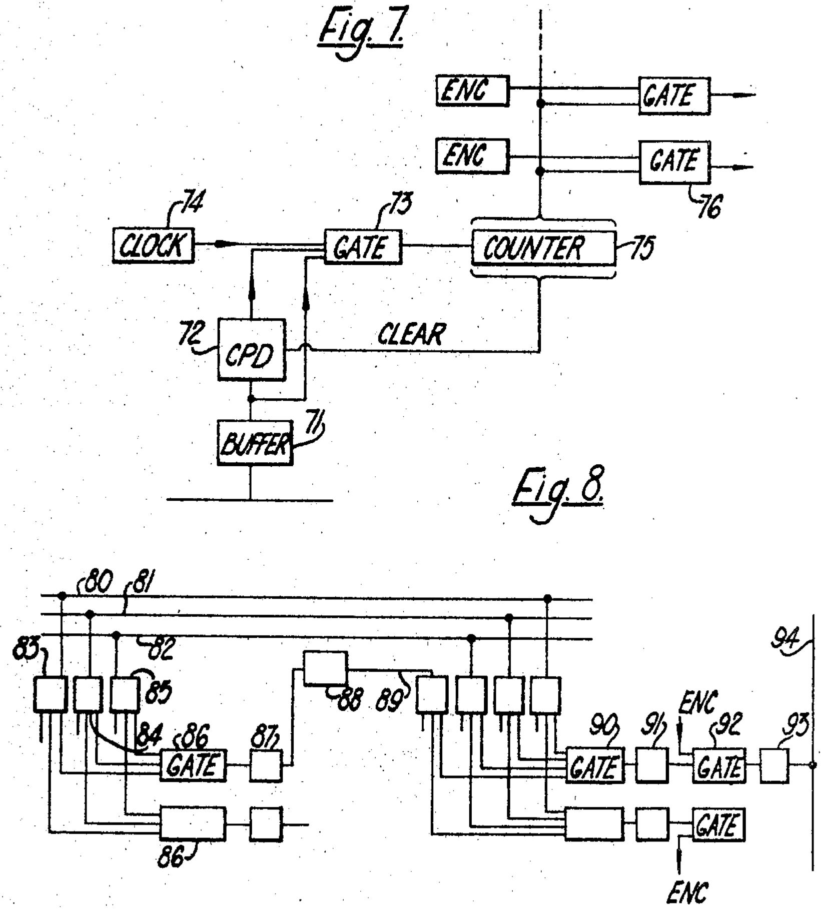
FIGURES 7 and 8 show alternative forms of apparatus for selecting one of a number of encoders.

To enable any one of the number of encoders at a single station to apply its pulse to a data line, the arrangement of FIGURE 7 may be used. In FIGURE 7, the calling pulse signal from the calling line 70 passes through a buffer amplifier 71 to a calling pulse discriminator 72 which, as described above, applies an output signal to a gate 73 only if the duration of the calling signal corresponds to its own characteristic period. This output signal prepares the gate 73 so that when a second calling signal is applied directly from the buffer amplifier 71 to the gate 73, the gate will pass clock pulses from a pulse generator 74 to a counter 75. The counter 75 thus accumulates a count which is proportional to the length of the second calling pulse. Gates 76 are selectively connected to various combinations of outputs from the counter elements, each gate having a characteristic count, so as to be opened if the number of clock pulses received by the counter during the second calling pulse corresponds to this count. When a gate is thus opened it allows a signal from a corresponding encoder 17 to pass through the gate to an ouput line driver circuit.

Instead of using a calling pulse of variable duration, a number of signals of fixed duration can be sent simultaneously each over a separate line or can be sent successively on a single line, the signals being sent in code combinations which operate gates at the receiver to allow the encoder signals through. In the arrangement shown in FIGURE 8, calling signals are sent over three lines 80, 81 and 82 and are applied through line buffer amplifiers 83, 84 and 85 to a series of gates 86 which are selectively connected to the lines. If the code combination is correct, one gate will be opened and will apply a signal through a monostable circuit 87 and a line driver circuit 88 to a connection 89. Signals on the lines 80, 81 and 82 and on the line 89 are applied selectively to further gates 90 which, through monostable circuits 91, are connected to the input of gates 92. Each gate 92 is connected to a different encoder so that a single encoder is selected by a suitable combination of pulses in a first group applied from the lines 80, 81 and 82 to the gates 86 and by a suitable combination of pulses in a second group applied to the same lines and to the gates 90. This selected encoder then transmits its signal through the line driver 93 to the output data line 94.

We claim:

1. Apparatus for converting electric signals in which data is expressed by variations of a first parameter into the electric signals in which the same data is expressed by variations of a different parameter, one of the said parameters being signal duration and the other signal amplitude, including means for generating a signal corresponding to an inequality in the relationships between the variable signal amplitude and a fixed reference amplitude, on the one hand, and a fixed reference duration and the variable signal duration on the other hand, one of the variable parameters being an input to the system and the other an output, together with a correcting circuit which receives the said inequality signal and modifies the output variable in such a sense as to reduce the inequality.

2. Apparatus for converting an electric signal representing data by its amplitude into an electric signal representing the same data by its duration, including means for obtaining electric pulses of the data-representing amplitude and of a fixed reference duration, means for obtaining electric signals of a fixed reference amplitude and of an adjustable data-representing duration, a comparator for comparing the product of the variable amplitude and the fixed duration with the product of the fixed amplitude and the variable duration, and an encoder responsive to an error signal from the comparator to modify the duration of the said variable duration signals in such a sense as to reduce the said error, the said variable duration signals constituting the ouput of the apparatus.

3. Apparatus for converting an electric signal representing data by its duration into an electric signal representing the same data by its amplitude, including means for obtaining electric pulses of the data-representing duration and of a fixed reference amplitude, means for obtaining electric pulses of fixed reference amplitude and of an adjustable data-representing duration, a comparator receiving the said pulses and arranged to compare the product of the variable duration and fixed amplitude with the product of the fixed duration and the variable amplitude, and an integrator responsive to an error signal from the comparator to modify the amplitude of the said variable amplitude pulses in such a sense as to reduce the said error, the said variable amplitude signals providing the output signals for the apparatus.

4. Apparatus in accordance with claim 1, in which the input signal of variable amplitude is obtained from the movement of the wiper of a potentiometer across which is applied a voltage of fixed reference amplitude.

5. Apparatus in accordance with claim 4, in which the voltage applied across the potentiometer is in the form of pulses of the said fixed reference duration.

6. Apparatus in accordance with claim 1, in which the input signal is derived from a variable-coupling transformer, the degree of coupling representing the value of the input parameter, and in which pulses of fixed reference amplitude and of fixed reference duration are applied to the primary winding of the said transformer, the pulses derived from the secondary winding being of an amplitude representing the said input parameter and of the fixed reference duration.

7. Apparatus in accordance with claim 1, in which the input signal is a signal of variable amplitude for which no reference amplitude is available, the apparatus including a circuit connected to receive the said input signal and also receiving as a control signal a signal of reference amplitude, the said circuit being such that any undesired variations in the signal of reference amplitude will cause coresponding variations to appear in the said input signal.

8. Apparatus in accordance with claim 7, in which the input signal is applied to a saturable reactor to which a fixed reference voltage is applied as a D.C. bias.

9. A data transmission system employing apparatus in accordance with claim 1, including means for transmitting, in addition to the output signal of variable duration, an output signal of the reference duration.

10. A system in accordance with claim 9, including a pulse generating circuit triggered by the output signal of variable duration and restored by the signal of reference duration, and means for transmitting the pulse generated by the said pulse generating circuit, whereby the data transmitted consists of a pulse of total length corresponding to the said reference duration and which includes a pulse of the said output duration.

11. A data transmitting system including apparatus in accordance with claim 1, and in which the outputs from a number of encoders are applied to individual gates, the gates being connected to a decoder receiving coded calling signals, whereby an encoder output is transmitted through its gate only in response to the receipt of a coded calling signal characteristic of that encoder.

12. A system in accordance with claim 11, in which the decoder includes a counter which, in response to a calling signal, receives clock pulses for the duration of the calling signal, the counter being so connected to the gates as to open a gate having a code corresponding to the duartion of the incoming calling signal.

13. A system in accordance with claim 11, including means for receiving calling signals over a number of channels, the calling signals together constituting a code for selecting an encoder, and in which individual gates are selectively connected to different combinations of calling channels, each gate causing the transmission of the output signal from a different encoder.

14. A system in accordance with claim 13, in which a first group of signals recived over the calling channels is applied to a first group of gates, and in which a subsequent group of signals applied over the calling channels is applied, together with the output of a selected one of the first group of gates, to a second group of gates, one of which will be selected by the code to cause the transmission of the output of one encoder.

References Cited

UNITED STATES PATENTS 2,552,013 5/1951 Orpin.

JOHN W. CALDWELL, Primary Examiner

H. I. PITTS, Assistant Examiner

307—231; 340—149, 164, 167